United States Patent
Gorelov et al.

(10) Patent No.: US 7,434,162 B2
(45) Date of Patent: Oct. 7, 2008

(54) VISUAL KNOWLEDGE PUBLISHER SYSTEM

(75) Inventors: Zor Gorelov, North Caldwell, NJ (US); David Cuddihy, Brooklyn, NY (US); Ruth Brown, New York, NY (US)

(73) Assignee: Speechcyle, Inc., New York, NY (US)

( * ) Notice: Subject to any disclaimer, the term of this patent is extended or adjusted under 35 U.S.C. 154(b) by 302 days.

(21) Appl. No.: 10/455,704

(22) Filed: Jun. 4, 2003

(65) Prior Publication Data

US 2003/0229855 A1    Dec. 11, 2003

Related U.S. Application Data

(60) Provisional application No. 60/386,609, filed on Jun. 6, 2002.

(51) Int. Cl.
*G06F 17/00* (2006.01)
(52) U.S. Cl. ...................................... 715/255
(58) Field of Classification Search ................ 715/513, 715/500, 501.1, 200, 205, 234, 255; 705/34
See application file for complete search history.

(56) References Cited

U.S. PATENT DOCUMENTS

| | | | | |
|---|---|---|---|---|
| 5,239,332 A | * | 8/1993 | Muramatsu et al. | 396/95 |
| 5,884,266 A | * | 3/1999 | Dvorak | 704/270.1 |
| 5,897,622 A | * | 4/1999 | Blinn et al. | 705/26 |
| 6,042,477 A | * | 3/2000 | Addink | 463/42 |
| 6,108,629 A | * | 8/2000 | Kasday | 704/258 |
| 6,125,376 A | * | 9/2000 | Klarlund et al. | 715/513 |
| 6,157,841 A | * | 12/2000 | Bolduc et al. | 455/456.5 |
| 6,480,860 B1 | * | 11/2002 | Monday | 707/102 |
| 6,577,758 B1 | * | 6/2003 | Kawata et al. | 382/151 |
| 6,683,622 B2 | * | 1/2004 | Arsenault | 345/666 |
| 6,938,000 B2 | * | 8/2005 | Joseph et al. | 705/26 |

(Continued)

FOREIGN PATENT DOCUMENTS

GB    2358264 A    *    7/2001

OTHER PUBLICATIONS

Kim, Conceptual Modeling and Specification Generation for B2B Business Processes Based on ebXML, ACM Mar. 2002, pp. 37-42.*

(Continued)

*Primary Examiner*—Cong-Lac Huynh
(74) *Attorney, Agent, or Firm*—Frommer Lawrence & Haug LLP; William S. Frommer

(57) ABSTRACT

A Visual Knowledge Publisher (VKP) system provides a graphical user interface environment that acts as a development platform for authoring predetermined dialog text for servicing various customer products and services and a Customer Interaction Platform for managing the interactions between the customer and the system. The VKP creates and outputs an XML document, using a Support Incident Markup Language (SIML). Each SIML document contains the procedural flows of the system's interactions with a human and the presentation elements of those interactions that are necessary to resolve the problem, often by a variety of methods. In this manner using a SIML document as input, voice and website dialogs may be defined a priori for various common problems. These dialogs allow a caller to interactively step through a procedure to resolve the problem using multiple channels (such as phone, web and PDA).

3 Claims, 2 Drawing Sheets

U.S. PATENT DOCUMENTS

| | | | |
|---|---|---|---|
| 6,964,012 B1* | 11/2005 | Zirngibl et al. | 715/513 |
| 6,986,104 B2* | 1/2006 | Green et al. | 715/234 |
| 7,020,839 B1* | 3/2006 | Hosoda | 715/523 |
| 7,089,258 B1* | 8/2006 | Brown et al. | 707/102 |
| 7,143,042 B1* | 11/2006 | Sinai et al. | 704/270.1 |
| 7,145,898 B1* | 12/2006 | Elliott | 370/352 |
| 7,275,080 B2* | 9/2007 | Arai | 709/203 |
| 2001/0010518 A1* | 8/2001 | Saitou | 345/433 |
| 2001/0012008 A1* | 8/2001 | Hongawa | 345/418 |
| 2002/0046109 A1* | 4/2002 | Leonard et al. | 705/14 |
| 2002/0091533 A1* | 7/2002 | Ims et al. | 705/1 |
| 2002/0103921 A1* | 8/2002 | Nair et al. | 709/232 |
| 2002/0107919 A1* | 8/2002 | Arai | 709/203 |
| 2002/0116351 A1* | 8/2002 | Skaanning et al. | 706/21 |
| 2002/0118815 A1* | 8/2002 | Andersen | 379/265.02 |
| 2002/0120485 A1* | 8/2002 | Kirkconnell-Ewing et al. | 705/8 |
| 2002/0143898 A1* | 10/2002 | Mansfield et al. | 709/219 |
| 2002/0154117 A1* | 10/2002 | Saitou | 345/440 |
| 2002/0156797 A1* | 10/2002 | Lee et al. | 707/200 |
| 2003/0066080 A1* | 4/2003 | Kamieniecki | 725/80 |
| 2003/0069943 A1* | 4/2003 | Bahrs et al. | 709/219 |
| 2003/0110450 A1* | 6/2003 | Sakai | 715/529 |
| 2003/0120560 A1* | 6/2003 | Almeida | 705/27 |
| 2003/0191679 A1* | 10/2003 | Casati et al. | 705/8 |
| 2003/0196206 A1* | 10/2003 | Shusman | 725/91 |
| 2003/0197062 A1* | 10/2003 | Shaw | 235/385 |
| 2003/0236693 A1* | 12/2003 | Chen et al. | 705/9 |
| 2004/0054695 A1* | 3/2004 | Hind et al. | 707/200 |
| 2004/0117383 A1* | 6/2004 | Lee et al. | 707/100 |
| 2004/0128136 A1* | 7/2004 | Irani | 704/270.1 |
| 2004/0128583 A1* | 7/2004 | Iulo et al. | 714/25 |
| 2004/0177002 A1* | 9/2004 | Abelow | 705/14 |
| 2004/0247094 A1* | 12/2004 | Crockett et al. | 379/88.17 |
| 2005/0131876 A1* | 6/2005 | Ahuja et al. | 707/3 |
| 2005/0210376 A1* | 9/2005 | Zirngibl et al. | 715/513 |
| 2005/0216421 A1* | 9/2005 | Barry et al. | 705/64 |
| 2005/0223285 A1* | 10/2005 | Faihe et al. | 714/25 |
| 2006/0031510 A1* | 2/2006 | Beck et al. | 709/226 |
| 2006/0277299 A1* | 12/2006 | Baekelmans et al. | 709/224 |
| 2008/0046810 A1* | 2/2008 | Schumacher et al. | 715/234 |
| 2008/0133978 A1* | 6/2008 | Angamuthu et al. | 714/39 |

OTHER PUBLICATIONS

Su et al., Automating the Transformation of XML Documents, ACM 2001, pp. 68-75.*

Grant, Info1: Pulling Power from Information Mike Bixby Wrote the Book on Implementing XML. Now, He's hoping His Peers Take a Page from it, ProQuest 2001, pp. 1-4.*

Freeland, Interleaf Announces WorldView 2, ProQuest 1993, pp. 1-5.*

Neto et al., An Open Linking Service Supporting the Authoring of Web Documents, ACM 2002, pp. 66-73.*

Steinberg et al., Cognitive Task Analysis, Interface Design, and Technical Troubleshooting, ACM 1992, pp. 185-191.*

Davidson et al., Intelligent Troubleshooting of Complex Machinery, ACM 1990, pp. 16-22.*

Guiagoussou et al., Implementation of a Diagnostic and Troubleshooting Multi-agent System for Cellular Networks, International Journal of Network Management 1999, pp. 221-237.*

* cited by examiner

Figure 1. SIML Presentation Elements Schema for Figure 2 Process 201

VISUAL KNOWLEDGE PUBLISHER SYSTEM

CROSS-REFERENCE TO RELATED APPLICATIONS

This application claims the benefit of U.S. Provisional Application Serial No. 60/386,609 filed Jun. 6, 2002, the entire contents thereof being incorporated herein by reference.

BACKGROUND OF THE INVENTION

The present invention relates to a visual knowledge publisher system for authoring and delivering virtual support center applications.

In order to provide prompt and convenient service for customers, many companies have established customer support call centers. These centers provide one or more telephone numbers a customer can use to receive service and support information about various products. Typically, a customer experiencing a problem with or having a question about a particular product or service or having questions or difficulty installing or configuring a product or service will call the corresponding support center to receive specific information relating to the question or problem and preferably, instructions for resolving the problem.

However, these customer support call centers suffer from at least the following problems. First, staffing a call center with enough knowledgeable operators, also called agents or customer service representatives, to address a meaningful range of likely problems can be very expensive. The call center must hire enough agents to handle those times when most calls occur, or callers could have excessively long hold times before speaking to an agent. Long hold times are annoying to customers and hurt a company's reputation for providing quality customer service. Long hold times are an even bigger problem when the company does not provide a toll-free number and the caller is required to pay for the call. Thus, a call center might have more agents than needed at any given time with their associated costs.

Second, the time and cost required to train new agents is considerable and in some cases it could be weeks before an agent is allowed to answer a call on his own. Agents staffing the support center must be provided with the knowledge necessary to resolve common product and service related questions and problems. Often, because of the large scope of potential problems, it is simply not practical to impart the required information (i.e. the problem knowledge base) to each agent. For example, many of today's complex products require a team of engineers—each having a specialized area of expertise—to design, build, and service the products. Thus, a single person may not have all the information needed to solve a particular problem.

Third, the job of an agent is often very repetitive, and turnover can be high as agents lose interest in their work and quit their jobs. The most common customer support questions can represent up to 80% of all calls received. Turnover of 50% or greater is not unusual. For example, for a company with 100 agents experiencing 50% turnover, 50 agents would quit in a 12-month period. High turnover adds additional costs to the customer support call center for recruiting and training.

Furthermore, some companies provide field technicians to service their products and services at the customer location. The field technicians may be employees of the company or third party providers who may not be well trained on the products and services they support. The field technicians may have questions or problems that arise in servicing the customer's products and services, and may call into a special call center staffed by more experienced technical agents, engineers or programmers. This technical staff could spend a significant amount time on the phone with a field technician due to the difficulty of the problem, the experience level of the field technician or the infrequency of occurrence of the particular problem. Field technician calls can be very expensive to the company considering the high cost of technical agents, engineers and programmers. In addition, the call center technical staff could be productively deployed elsewhere if less time were required on the phone.

In an attempt to automate call centers, some companies have tried using prerecorded messages to provide answers to various common problems. Typically, a caller will hear simple audio recordings of portions of a spoken dialog that identify specific topics or problems. The caller is asked to press a certain key on his phone to identify the problem he is having. The caller will then hear another simple audio recording in the form of instructions for resolving a particular problem. These automated recordings are presented to the caller using what is called touch-tone Interactive Voice Response systems or IVR. Although the IVR instructions may resolve the aforementioned problems, the prerecorded solutions lack the flexibility to accept spoken inputs from the customer and tailor the response to the customer's specific situation. In addition, in order that the recordings be kept within a reasonable amount of time (since callers must memorize the instructions), the instructions may be simplified and generalized to such an extent that they do not provide sufficient help for the caller. Often, this results in unresolved problems and customer frustration. Alternatively, IVR is used by some customer support call centers for the caller to request a fax containing instructions for resolving a problem. This solution only works for callers who have fax machines and who are willing to wait for the fax to be sent which could be delayed by up to a day.

Another solution many companies have adopted is to establish websites to place product service information on the internet. These sites allow for detailed instructions with figures and graphics to be used. However, searching for these instructions for a specific product model is often confusing and finding the right set of instructions can be difficult, especially for a less experienced internet user. In addition, these sites have limited interactivity to address unique customer problems and specific questions, and obviously require that the customer has access to the internet.

SUMMARY OF THE INVENTION

Therefore, a need exists for a capability to automate certain customer support procedures by first graphically representing them and then generating spoken dialogs and Website pages for use in customer service call centers. Specifically, a means is needed to provide a visual authoring environment for the representation and creation of various customer support procedures such as installation, configuration, and repair processes, and other types of customer support processes like billing and order management questions. collectively called "Customer Support Processes," for various products, including computers and computer peripherals, consumer and office electronic equipment, for services, including cable, broadband, internet dial-up and wireless access services and for software-related products. In addition, a system is needed that provides the capability for product specialists or knowledge architects (non-programmers) to define these Customer Support Processes using visual tools.

A further need exists for a virtual customer support system that can interact in a conversational manner with a caller, using, for example, a technology called automatic speech recognition, to resolve product or service related problems and questions over the phone. Such a system should also be operable using multiple channels, such as the internet and advanced wireless communication devices, such as PDAs. The system should also be able to gather information from other sources (i.e. customer service agent training material, internet support articles, knowledge bases and Frequently Asked Questions, called FAQs) and direct a caller to those sources for diagrams and instructions when appropriate. For calls placed over the internet using Voice over IP (VoIP) or when callers are using advanced multi-modal wireless communication devices, there is a need for real time synchronization between the call dialog and the direction to specific internet diagrams and instructions. Preferably, a solution to this problem should be cost effective and readily implementable.

The preferred embodiment of the invention provides a visual knowledge publisher (VKP) system which includes an authoring environment for generating spoken dialogs, static and interactive Website pages, documents and various displays for wireless communication devices, collectively called "Outputs" or "Dialogs" which contain the information (knowledge) necessary for resolving or answering common product or service problems or questions, and a delivery engine for presenting the Outputs or Dialogs to the customer. The VKP generates and outputs an XML document, also called a schema instance, using a Support Incident Markup Language (SIML). SIML is a unique markup language developed specifically to describe Customer Support Processes for the purpose of automating customer interactions. Using SIML documents (i.e. schema documents or schema instances), Outputs or Dialogs such as spoken conversations, Website pages, documents and displays for wireless communication devices may be generated a priori for various common problems and procedures. Each SIML document contains the knowledge/information necessary to resolve the problem, including procedural flows of the system's interactions with a human and the presentation elements of those interactions, often by a variety of methods. SIML documents can also be linked together to resolve complex and/or multiple problems.

Another aspect of the system is that Outputs or Dialogs can be generated in various formats including voice dialogs, Web-based interactive troubleshooting guides and knowledge-base support articles in plain text, hypertext, portable document format (PDF), and WML format (for use by advanced wireless communication devices such as PDAs). The system also provides a delivery engine called the Customer Interaction Platform (CIP) that delivers the Outputs or Dialogs to the customer in the various formats.

Still other objects and advantages of the invention will in part be obvious and will in part be apparent from the specification and the drawings.

BRIEF DESCRIPTION OF THE DRAWINGS

For a more complete understanding of the invention, reference is made to the following description and accompanying drawings, in which.

Figure 2:
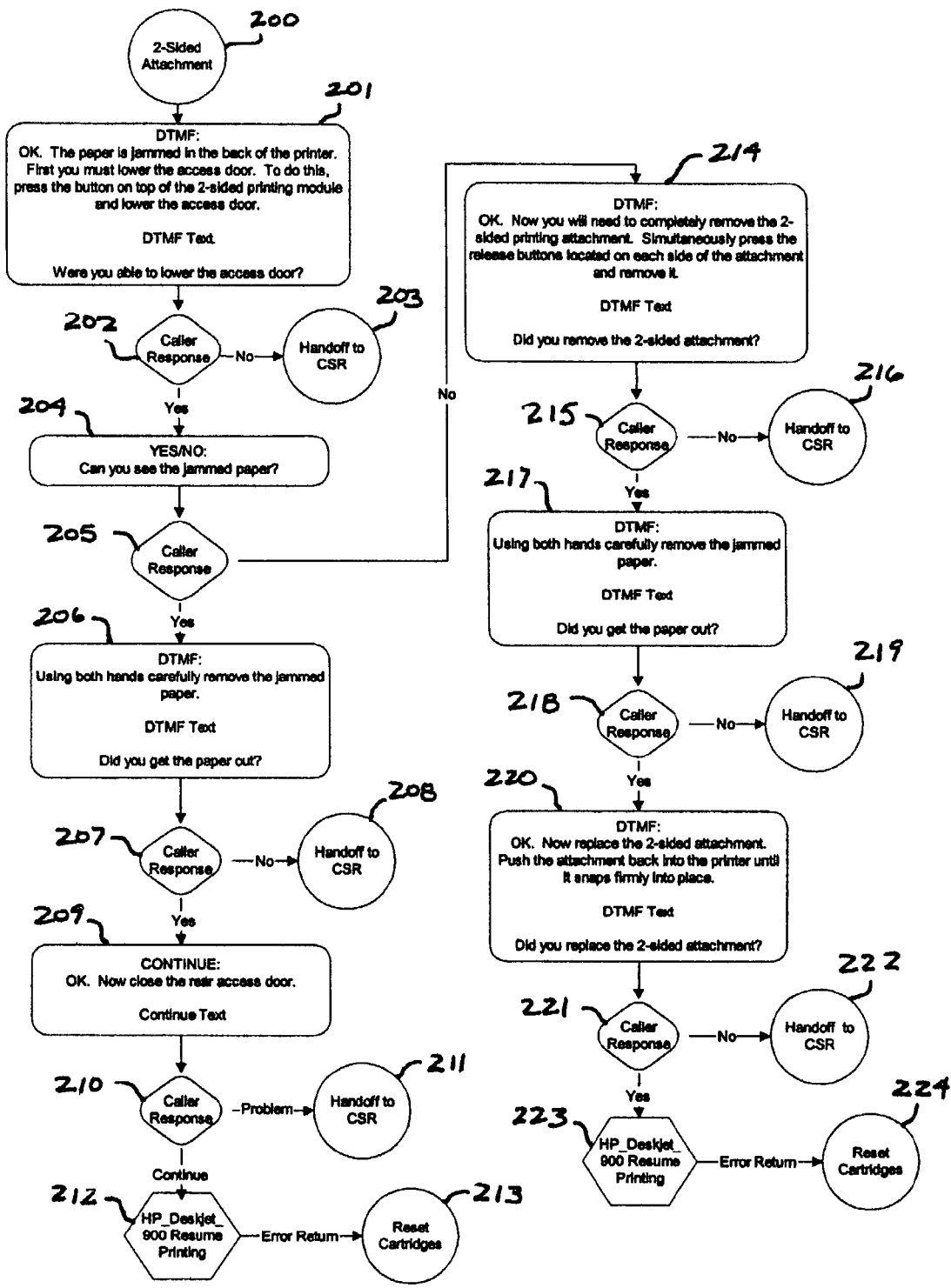
FIG. 2 is a process diagram for an example paper-jam clearing problem.

Appendix A is an example SIML coding for the example paper-jam clearing problem shown in FIG. 2, Step 201; and Appendix B is an example of VoiceXML coding for the "TwoHandedStep" portion (Step 201(A)) of Appendix A.

DETAILED DESCRIPTION OF THE PREFERRED EMBODIMENTS

The preferred embodiments of the apparatus and method according to the present invention will be described with reference to the accompanying drawings.

The invention is a visual knowledge publisher (VKP) system, comprising an Authoring Tool along with a Support Incident Markup Language (SIML) and a Customer Interaction Platform which together act as an authoring environment for generating Outputs also called Dialogs, such as spoken conversations, static and interactive Website pages, documents and various displays for wireless communication devices which contain the information (knowledge) necessary for resolving common product or service problems or questions and a delivery engine for presenting the Outputs or Dialogs to the customer. Essentially, the VKP is a graphical publishing environment called the Authoring Tool, for creating predetermined Output text for servicing various customer products or services in SIML format and an engine called the Customer Interaction Platform for transforming and delivering that Output text to a customer.

For example, a customer whose printer is jammed can call a support number and receive step-by-step instructions for resolving the problem based on a predetermined Dialog generated using the VKP. The information provided by the caller in response to prompts by the spoken dialog allow the caller to interactively step through a procedure to resolve the problem. Note this printer jam problem is used as an example throughout this disclosure. However, the invention should not be construed as being limited to this application.

The VKP provides an Authoring Tool, SIML and the Customer Interaction Platform (CIP). The Authoring Tool is a graphical user interface environment which acts as a development platform for authoring procedures for servicing various customer products and services. The Authoring Tool generates and outputs a schema document (or schema instance) called a SIML document using a Support Incident Markup Language (SIML). SIML is a unique markup language developed specifically for customer support applications. The SIML documents, can be transformed by the CIP into multiple output formats, such as VoiceXML (Voice Extensible Markup Language), SALT (Speech Application Language Tag), PDF (Portable Document Format), HTML (Hypertext Markup Language), or WML (Wireless Markup Language) documents, which can then be delivered by the CIP to the customer.

Using these SIML documents, Outputs or Dialogs may be generated a priori for various common problems and procedures. Each SIML document contains the knowledge/information necessary to resolve the problem or question, including procedural flows of the system's interactions with a human and the presentation elements of those interactions, often by a variety of methods. The SIML procedural flows can be represented by any process definition or process modeling language, for example, by the XML Process Definition Language (XPDL)—an open standard published by the Workflow Management Coalition (WfMC).

XPDL provides a framework for implementing business process management and workflow engines, and for designing, analyzing, and exchanging business processes, such as customer support procedures. XPDL uses the XML language to describe a business process. A process defined in XPDL (a set of XML statements) can be imported for processing into any workflow engine that supports XPDL, such as the VKP system's CIP. The XPDL process definition can be generated by workflow modeling and simulation tools, such as the VKP system's Authoring Tool, or can be manually coded.

To the extent possible, the system is designed to be generic with parameters that can be changed easily from one customer support process to the next. The system generates code in standard text-based formats that is independent of specific software, hardware, and communications platforms. The system is also designed to support translating into languages other than English. In addition, the generation process is flexible so as to accommodate the multiple output formats which may be generated by the VKP. The generation process also provides automatic synchronization between output formats. For example, a spoken dialog may direct a caller to a specific Website page to see an image associated with the dialog. Thus, the caller may access multiple channels, such as the phone, Web and advanced wireless devices (PDAs) to interactively step through a procedure to resolve a problem.

The system also provides a delivery engine called the Customer Interaction Platform (CIP) that delivers the Outputs or Dialogs to the customer in the various formats. The CIP processes the output of the authoring platform, interacts with the customer and manages the interaction with back-end processes to enforce business rules.

The ability to add new actions (markups) and elements as needed is supported. The following are some examples of the types of actions (markups) supported by the system:

Announcement—present a message to the user (e.g. Welcome message);

Escalate—Pass the user to a human agent;

ImportantInfo—Present information to the user that he would want to write down;

One-Handed Step—Give the user an instruction for which he doesn't need to disengage from the Output or Dialog (i.e. doesn't have to put the phone down, stand up from the computer, etc.);

PresentString—Present a sequence of tokens such as digits or letters to the user (e.g. RQST12345);

Terminate—End the user session;

WaitForUser—Wait for the user to complete a task, then indicate that he is ready to proceed;

CustomActivity—Call a pre-existing user-interface module;

YesNoQuestion—Ask the user a yes/no question;

SingleQuestion—Ask a question for which the answer is one of a finite set of options (e.g. product model or serial number);

DigitsQuestion—Collect a sequence of tokens from the user (e.g. the manufacturing code);

CollectWholePart—Collect a sequence of tokens broken into segments (e.g. Ethernet MAC or computer IP address); and CollectGenSpec—Execute a series of questions that refine the answer of the previous question (e.g. Operating System, Microsoft Windows XP).

SIML documents can also be linked together to resolve complex and/or multiple problems. Authors are able to tag (using attributes such as product vendor, product type and product series) some processes as "shared." Shared processes can be referenced or re-used by other processes. For example, a "Print Test Page" shared process for a printer can be used by a "Paper Jam" or "Missing Colors" process to verify the problem has been successfully resolved.

The VKP also supports the use of Content Associations which link and synchronize audio and visual content relating to a Customer Support Process. For example, if there is an existing knowledge-base article on a website, that includes a diagram showing how to replace a printer cartridge, then the specific website diagram may be included in the process description and the generator includes a dialog directing callers to the website.

Outputs or Dialogs can interact with a caller by using several types of prompts supported by the system. These prompt types include informational prompts, questions requiring a response, instructions which may have confirmation prompts associated with them, replay prompts, and prompts preceding an action to be taken, such as handoff to an agent, among others. Spoken prompts may be prerecorded or may be provided using text-to-speech (that is, text "read" by a computer voice). Prompts are based on element descriptions entered by the document author. Default prompt responses may be selected by the author. Guidelines for proper prompts can be accessed from the help utility included in the Authoring Tool (described below).

Further, Dialogs generated by the system may be contextually aware; i.e. they have the ability to store, retrieve and process information collected before or during the resolution process. For example, information collected during the interaction with the caller (such as whether she has a two-sided printing attachment physically attached to her printer) must be saved in context so that she is prompted for it only once. In addition, the process may vary depending on the operating system or hardware being used by the caller.

The system also has a remote control capability for remotely initiating system events and actions. For example, the system can remotely send a reset event to a caller having a cable modem problem and then prompt the caller to confirm that the cable modem was reset.

The VKP system contains an Authoring Tool, a SIML schema, and a Customer Interaction Platform containing generators to transform SIML documents to voice and Web dialogs and to manage all aspects of the interaction between the system and the customer. Each of these modules is described below in more detail. Although not considered part of the invention, text-to-speech and voice recognition processors may be used in conjunction with the invention to interactively communicate with the caller over the phone or VoIP.

The Authoring Tool is a graphical editor designed for non-programmers with standard drag and drop objects that reflect underlying schema elements and can be used to easily describe various Customer Support Processes (i.e., installation, configuration, repair, billing and order management processes). Further, the Authoring Tool provides a design time "re-play" capability with the targeted text-to-speech (TTS) engine, so that a dialog can be debugged during its design.

The Authoring Tool can operate as part of Microsoft Visio™ or with other graphical flowcharting tools as the design interface for the author. Visio™ provides a convenient graphical framework for developing software applications. In addition, Visio™ provides an XML (Extensible Markup Language) vocabulary, or schema, that defines all the XML tags for a document's data elements and attributes and their relationships. The Authoring Tool is used to define both customer support processes, which can be defined in XPDL, and assign presentation and user interaction properties to individual activities or tasks within these processes. The Authoring Tool can use SIML validation rules to verify the correctness of the generated XML files.

The VKP Authoring Tool generates documents in XML format which define generic Customer Support Processes including various phases, actions and dependencies and is represented by the unique language called Support Incident Markup Language (SIML). SIML supports installation, configuration and problem diagnostics, repair and testing phases, billing, order management and other customer support inquiries, and is designed to accommodate various caller actions (e.g. one handed versus two handed operations). SIML elements are represented using visual objects, such as specially-designed Visio™ shapes and stencils. A SIML Editor is provided as part of the Authoring Tool to edit the elements of a particular interaction, e.g. precise text to be used as part of a voice dialog. SIML will be discussed in more detail hereinafter.

The voice dialog generator converts a SIML document (or instance of the schema) into voice dialogs. Voice dialog generation (in VoiceXML or another format) including call flows and text or audio prompts is provided. In addition, a graphical representation of the voice dialogs (in Visio™ format or some other graphical format) may be generated. This provides an easy to follow and comprehensive means to cover every branch in the call flow with prompts. Both voice dialogs and their graphical representations include tracing information that links them back to the elements of the original SIML documents.

The Web dialog generator converts a SIML document into website HTML pages. Web dialog generation for Customer Support Processes may be in the form of interactive troubleshooting guides, FAQs or some other website page. As in the case of voice dialogs, a graphical representation may be provided to link back to the elements of the SIML document.

Moreover, the system is implemented using the Support Incident Markup Language (SIML). SIML is an XML language specifically developed for use in this system. SIML represents and describes every detail of the system's behavior. A SIML document set includes both the information needed to manage the execution of the customer support procedure flow, also called workflow and the complete user interaction including the product knowledge and the user-interface for voice and online interactions.

As discussed above, the system supports the authoring of SIML documents in XML format. XML is the universal format for structured documents and data on the Web. Just as HTML (Hypertext Markup Language) provides a way to display information on different hardware and software platforms by creating a standard set of fixed, non-customizable tags that a browser interprets and displays, XML provides a way to create documents with custom tags that allows the separation of document content from content presentation. According to the World Wide Web Consortium (W3C), XML schemas express shared vocabularies and allow machines to carry out rules made by people. XML schemas provide a means for defining the structure, content and semantics of XML documents. Since XML is simply a text format, a developer can use text-processing software to access the data. And because the definition follows standard rules, there are generic interfaces that allow access to the internal data.

Further, as one example of a generated Dialog, the system supports use of the Voice Extensible Markup Language (VoiceXML). VoiceXML is a subset of XML that has been specifically designed for creating audio dialogs that feature synthesized speech, digitized audio, recognition of spoken and DTMF (touch-tone) key input, recording of spoken input, telephony, and mixed-initiative conversations. VoiceXML brings the advantages of web-based development and content delivery to interactive voice response applications.

Figure 1:
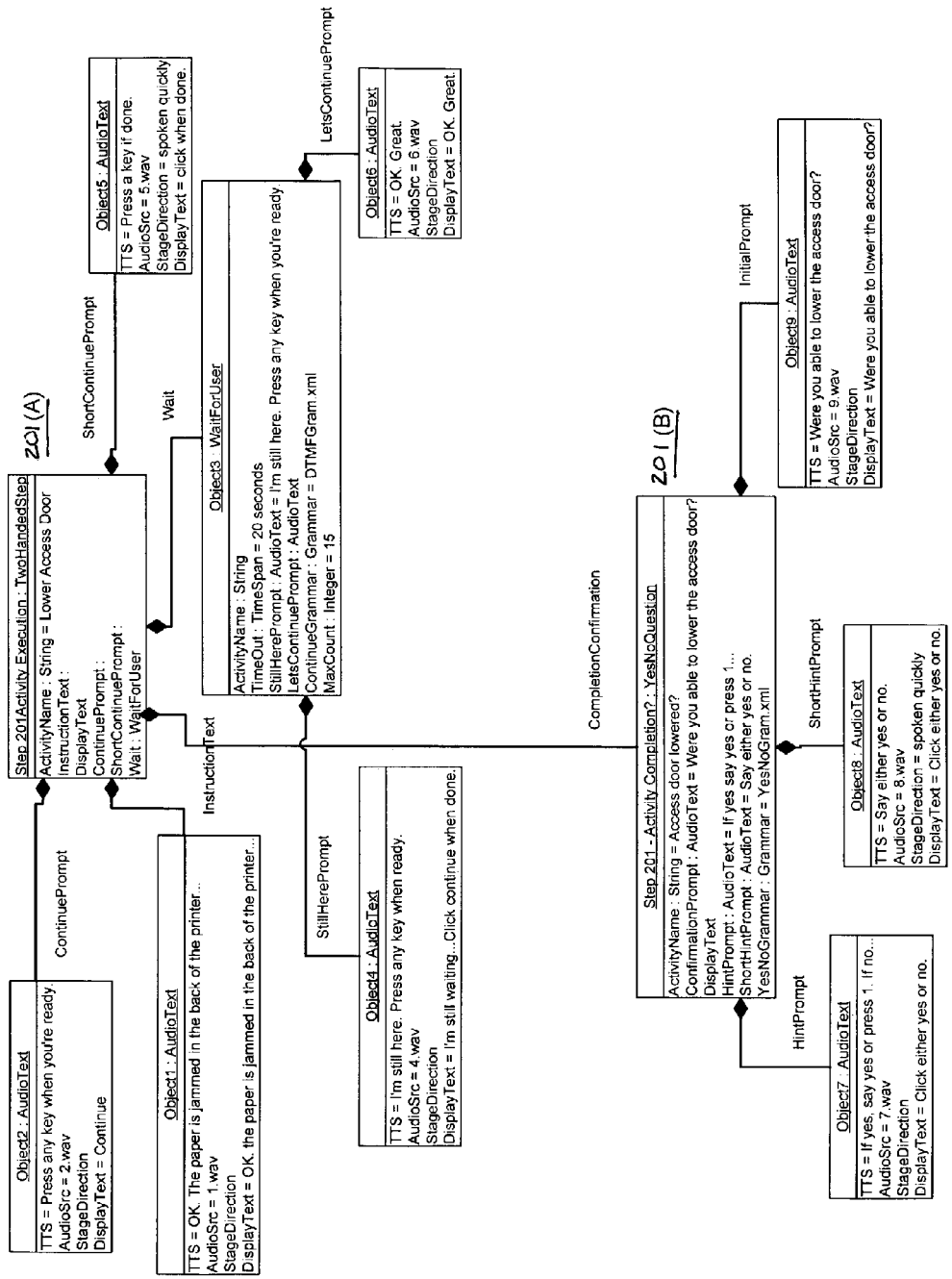
FIG. 1 is an example of a SIML Presentation Elements schema showing the hierarchy of SIML elements that comprise the paper-jam clearing problem shown in FIG. 2, Step 201.

The following example, as shown using FIGS. 1-2 and Appendix A and B, steps through the development of a problem resolution dialog for a paper-jam clearing problem according to the invention. The example is used to describe SIML problem resolution schema elements, visual Customer Support Process flow, SIML documents, and the resulting VoiceXML template.

FIG. 1 is an exemplary SIML Presentation Element schema showing hierarchical interconnections between various sample declarations. This provides a framework for developing a schema element instance for a particular activity that allows customers to perform a task with confirmation that the task was completed. The declarations shown in FIG. 1, Step 201(A) "TwoHandedStep" and Step 201(B) "YesNoQuestion" are defined as follows:

<TwoHandedStep>
This SIML element provides an instruction that is to be performed by the customer while he/she is interacting with the CIP (i.e. while on the phone or in front of a web-page). This instruction might require the user to get up from his/her computer, put down the phone, etc.
Attributes:
ActivityName—unique identifier for the element.
InstructionText—main step instruction prompt to be used with TTS or audio.
DisplayText—instruction for display on visual platforms like the Web.
ContinuePrompt—TTS or audio prompt to signal activity completion.
ShortContinuePrompt—short version of ContinuePrompt.
Wait—waits for a specified period of time for customer to complete a task.
The "TwoHandedStep" is always followed by a "YesNoQuestion" that is required to validate the activity or task completion status.
<YesNoQuestion>
This SIML element is used to present a Yes/No question to the customer and process customer's response. A Yes/No question handles generic "yes" and "no" responses, such as "that's right", "correct", "nope", "no way" among others. In addition it handles "I don't know" or "I cannot find it" type of responses.
Attributes:
ActivityName—unique identifier for the element.
ConfirmationPrompt—main confirmation instruction prompt to be used with TTS or audio.
DisplayText—confirmation instructions for display on visual platforms like the Web.
HintPrompt—TTS or audio prompt to assist customer in responding to the initial confirmation prompt.
ShortHintPrompt—short version of HintPrompt.
YesNoGrammar—grammar file describing customer responses.

Within this general framework of exemplary declarations, SIML documents may be produced with the VKP system's Authoring Tool using drag and drop graphical authoring of Customer Support Processes for various products and services. FIG. 2 is a process diagram for a portion of an example paper-jam clearing problem.

The portion shown in FIG. 2, begins after the caller has already identified the printer model and identified the problem as a paper jam in the two-sided printing attachment module 200. The process instructs the caller to lower the access door to the two-sided printing module 201 and waits for the caller's response 202. If the caller has not been able to lower the access door, the process transfers the caller to a customer service representative 203. If the caller has lowered the door, the process asks the caller whether he can see the jammed paper 204 and again waits for a response 205. If yes, the caller is instructed to remove the paper 206 and waits 207. If the caller has not been able to remove the paper, the process transfers the caller to a customer service representative 208. If the caller has removed the paper, the process instructs the caller to close the access door 209 and waits until the caller is ready 210. If the caller still has a problem, the process transfers the caller to a customer service representative 211. If the caller indicates he is ready to continue, the process transfers to a shared resolution tag 212. If an error is returned by the shared tag, then the process transfers to a Reset Cartridges process 213.

If in step 205, the caller responds that he cannot see the jammed paper, the caller is instructed to remove the two-side printing attachment 214 and waits 215. If the caller has not been able to remove the attachment, the process transfers the caller to a customer service representative 216. If the caller has removed the attachment, the caller is instructed to remove the paper 217 and prompts for a response 218. If the caller has not been able to remove the paper, the process transfers the caller to a customer service representative 219. If the caller has removed the paper, the process instructs the caller to replace the attachment 220 and waits until the caller is ready 221. If the caller still cannot replace the attachment, the process transfers the caller to a customer service representative 222. If the attachment is replaced, the process transfers to a shared resolution tag 223. If an error is returned by the shared resolution tag, then the process transfers to a Reset Cartridges process 224. Obviously, this is only a representative portion of any paper jam resolution process.

Once the SIML document has been created, it can be translated into one or more output formats, such as VoiceXML, SALT, HTML and/or WML. Appendix A is an example SIML document for the example paper-jam clearing problem shown by FIG. 2, Step 201. Appendix B is the VoiceXML coding for Appendix A, Step 201(A) "TwoHandedStep."

While a preferred embodiment of the present invention has been described using specific terms, such description is for illustrative purposes only, and it is to be understood that changes and variations may be made without departing from the spirit or scope of the following claims.

APPENDIX A

SIML Code Sample for FIG. 2, Step 201

```
<?xml version="1.0" ?>
<SIML>
    <!--
        ##
        ## Start: XPDL Portion of SIML Paper Jam Clearing Problem - FIG. 2
        ##
    -->
    <Workflows>
        <WorkflowProcesses>
        <!--
            ##
            ## SIML Workflow Activities and Transitions for Paper Jam Clearing Problem - FIG. 2
            ##
        -->
        <WorkflowProcess Id="0" Name="FixPaperJam">
            <Activities>
                <Activity Id="0"></Activity>
                <Activity Id="1" Name="Lower access door"></Activity>
                <Activity Id="4" Name="Remove jammed paper"></Activity>
                <Activity Id="6" Name="Handoff to CSR"></Activity>
                <Activity Id="10" Name="Handoff to CSR"></Activity>
                <Activity Id="12" Name="Reset Cartridges">
                <Implementation>
                    <SubFlow Id="ResetCartridges" Execution="SYNCHR">
                        <ActualParameters />
                    </SubFlow>
                </Implementation>
                </Activity>
                <Activity Id="13" Name="Access door lowered?"></Activity>
                <Activity Id="14" Name="Can see jammed paper?"></Activity>
                <Activity Id="15" Name="Removed paper?"></Activity>
                <Activity Id="16" Name="Close access door"></Activity>
                </Activity Id="17" Name="Resume Printing">
                <Implementation>
                    <SubFlow Id="ResumePrinting" Execution="SYNCHR">
                        <ActualParameters />
                    </SubFlow>
                </Implementation>
                </Activity>
                <Activity Id="19" Name="ok"></Activity>
                <Activity Id="20" Name="Resume printing">
                <Implementation>
                    <SubFlow Id="ResumePrinting" Execution="SYNCHR">
                        <ActualParameters />
                    </SubFlow>
                </Implementation>
                </Activity>
                <Activity Id="21" Name="Handoff to CSR"></Activity>
```

APPENDIX A-continued

SIML Code Sample for FIG. 2, Step 201

```xml
                <Activity Id="22" Name="err"></Activity>
                <Activity Id="23" Name="err"></Activity>
                <Activity Id="25" Name="err"></Activity>
                <Activity Id="26" Name="Remove two-sided attachment"></Activity>
                <Activity Id="27" Name="Attachment removed?"></Activity>
                <Activity Id="28" Name="Handoff to CSR"></Activity>
                <Activity Id="29" Name="err"></Activity>
                <Activity Id="30" Name="Remove jammed paper"></Activity>
                <Activity Id="31" Name="Removed paper?"></Activity>
                <Activity Id="32" Name="Replace two sided attachment"></Activity>
            </Activities>
            <Transitions>
                <Transition Id="0" From="16" To="10" Name="problem"></Transition>
                <Transition Id="1" From="15" To="10" Name="no"></Transition>
                <Transition Id="2" From="4" To="15" Name="ok"></Transition>
                <Transition Id="3" From="15" To="16" Name="ok"></Transition>
                <Transition Id="4" From="16" To="17" Name="ok"></Transition>
                <Transition Id="5" From="17" To="12" Name="problem"></Transition>
                <Transition Id="6" From="17" To="19" Name="ok"></Transition>
                <Transition Id="7" From="12" To="20" Name="ok"></Transition>
                <Transition Id="8" From="20" To="19" Name="ok"></Transition>
                <Transition Id="9" From="20" To="21" Name="problem"></Transition>
                <Transition Id="10" From="10" To="22"></Transition>
                <Transition Id="11" From="12" To="21" Name="problem"></Transition>
                <Transition Id="12" From="21" To="23"></Transition>
                <Transition Id="13" From="0" To="1"></Transition>
                <Transition Id="14" From="1" To="13" Name="ok"></Transition>
                <Transition Id="15" From="13" To="14" Name="yes"></Transition>
                <Transition Id="16" From="13" To="6" Name="no"></Transition>
                <Transition Id="17" From="6" To="25"></Transition>
                <Transition Id="18" From="14" To="4" Name="yes"></Transition>
                <Transition Id="19" From="14" To="26" Name="no"></Transition>
                <Transition Id="20" From="26" To="27" Name="ok"></Transition>
                <Transition Id="21" From="28" To="29"></Transition>
                <Transition Id="22" From="27" To="28" Name="no"></Transition>
                <Transition Id="23" From="31" To="10" Name="no"></Transition>
                <Transition Id="24" From="27" To="30" Name="yes"></Transition>
                <Transition Id="25" From="30" To="31" Name="ok"></Transition>
                <Transition Id="26" From="32" To="17" Name="ok"></Transition>
                <Transition Id="27" From="32" To="28" Name="problem"></Transition>
                <Transition Id="28" From="31" To="32" Name="yes"></Transition>
            </Transitions>
        </WorkflowProcess>
        <!--
            ##
            ## Activities and Transitions for Resume Printing Process 212
            ##
        -->
        <WorkflowProcess Id="1" Name=ResumePrinting">
        </WorkflowProcess>
        <!--
            ##
            ## Activities and Transitions for Reset Cartridges Process 213
            ##
        -->
        <WorkflowProcess Id="2" Name="ResetCartridges">
            .
            .
            .
        </WorkflowProcess>
    </WorkflowProcesses>
/Workflows>
!--

End: XPDL Portion of SIML Paper Jam Clearing Problem - FIG. 2

-->
<!--

Start: SIML Presentation Portion of SIML Paper Jam Clearing Problem - FIG. 2

-->
<PresentationElements>
<!--

SIML Presentation Elements for the "Lower access door" Activity of the
Paper Jam Clearing Problem - FIG. 2 Process 201
```

APPENDIX A-continued

SIML Code Sample for FIG. 2, Step 201

```xml
    ##
-->
<TwoHandedStep>
    <ActivityName>Lower access door</ActivityName>
    <InstructionText>
        <TTS>OK. The paper is jammed in the back of the printer. First you must lower the
        access door. To do this press the button on top of the 2-sided printing module
        and lower the access door.</TTS>
        <AudioSource>1.wav</AudioSource>
    </InstructionText>
    <Wait>
        <TimeOut>00:00:20</TimeOut>
        <MaximumCount>20</MaximumCount>
        <StillHerePrompt>
            <TTS>I'm still here. Say continue when you're ready.</TTS>
            <StageDirection />
            <AudioSource>4.wav</AudioSource>
        </StillHerePrompt>
        <LetsContinuePrompt>
            <TTS>Great.</TTS>
            <StageDirection />
            <AudioSource>6.wav</AudioSource>
        </LetsContinuePrompt>
        <ContinueGrammar>
            <Mode>None</Mode>
            <Src>DTMFGram.xml</Src>
        </ContinueGrammar>
    </Wait>
    <ContinuePrompt>
        <TTS>Press any key on your phone to continue.</TTS>
        <AudioSource>2.wav</AudioSource>
    </ContinuePrompt>
    <ShortContinuePrompt>
        <TTS>Press a key when ready.</TTS>
        <StageDirection>spoken quickly</StageDirection>
        <AudioSource>5.wav</AudioSource>
    </ShortContinuePrompt>
</TwoHandedStep>
<YesNoQuestion>
    <ActivityName>Access door lowered?</ActivityName>
    <SpeechText>
        <TTS>Were you able to lower the access door?</TTS>
        <AudioSource>9.wav</AudioSource>
    </SpeechText>
    <ShortHintPrompt>
        <TTS>Say either yes or no.</TTS>
        <AudioSource>8.wav</AudioSource>
    </ShortHintPrompt>
    <HintPrompt>
        <TTS>If yes say yes or press 1. If no say no or press 2.</TTS>
        <AudioSource>7.wav</AudioSource>
    </HintPrompt>
    <YesNoGrammar>
        <Mode>None</Mode>
        <Src>YesNoGram.xml</Src>
    </YesNoGrammar>
</YesNoQuestion>
<!--
    ##
    ## SIML Presentation Elements for each user-facing
    ## activity specified in the workflow portion of
    ## this SIML-document-set continue here.
    ##
-->
</PresentationElements>
<!--
    ##
    ## End: SIML Presentation Portion of SIML Paper Jam Clearing Problem - FIG. 2
    ##
-->
</SIML>
```

APPENDIX B

VoiceXML Sample Code for the TwoHandedStep portion of Appendix A

```xml
<?xml version="1.0" ?>
<vxml version="2.0">
    <meta name="MAINTAINER" content="support@telleureka.com" />
    <property name="loglevel" value="4" />
    <var name="TwoHandedStepExperience" />
    <form id="twohandedstep">
        <var name="status" />
        <var name="Transition" />
        <var name="Exception" />
        <var name="TwoHandedStepExperience" />
        <block id="instruction">
            <prompt>
                <audio src="http://levelone.telleureka.com/audio/1.wav">
                    OK. The paper is jammed in the back of the printer.
                    First you must lower the access door.
                    To do this press the button on top of the 2-sided printing
                    module and lower the access door.
                </audio>
            </prompt>
            <prompt>
                <audio src="http://levelone.telleureka.com/audio/5.wav">
                    Press a key when ready.
                </audio>
            </prompt>
        </block>
        <var name="ActivityName" expr="'Lower access door.Wait'"/>
        <subdialog name="wait" src="../WaitForUser/WaitForUserDM.aspx" namelist="ActivityName">
            <param name="continueSpec" expr="'continueOnAnything'" />
            <filled>
                <assign name="status" expr="wait.status" />
                <if cond="wait. status =='Transition'">
                    <assign name="Transition" expr="wait.Transition" />
                    <assign name="TwoHandedStepExperience"
                        expr="(new Number(TwoHandedStepExperience)) + 1" />
                <else />
                    <assign name="Exception" expr="wait.Exception" />
                </if>
                <return namelist="status Transition Exception TwoHandedStepExperience" />
            </filled>
        </subdialog>
    </form>
</vxml>
```

What is claimed is:

1. A method of designing and creating automated customer support processes using a visual knowledge publisher system, comprising the steps of:
   graphically defining a process for troubleshooting a customer's problem by positioning and interconnecting predetermined graphical objects in a flowchart using an authoring tool;
   translating the interconnected graphical objects into a computer-readable Support Incident Markup Language (SIML) document executable by a computer to perform the troubleshooting process; SIML being a custom defined markup language for describing customer support processes to automate customer interactions; and
   converting the SIML document into a voice interface for interactively directing a user through said process using a convergent interaction platform.

2. The method according to claim 1, wherein the SIML document includes product information and a procedural flow for resolving a specific customer support problem and presentation elements for the visual knowledge publisher system's interactions with the user.

3. The method according to claim 1, wherein SIML documents can be linked together to resolve complex and/or multiple problems.

* * * * *